H. R. EDGECOMB.
MEASURING INSTRUMENT.
APPLICATION FILED AUG. 11, 1913.
1,270,800.
Patented July 2, 1918.
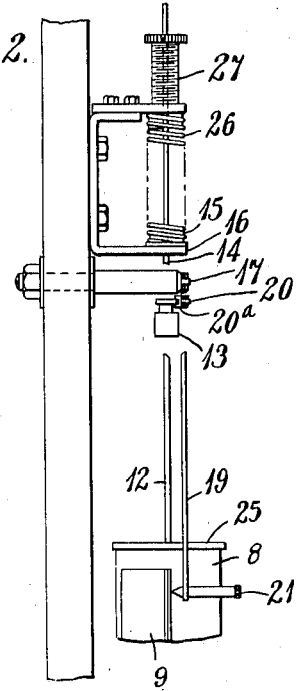
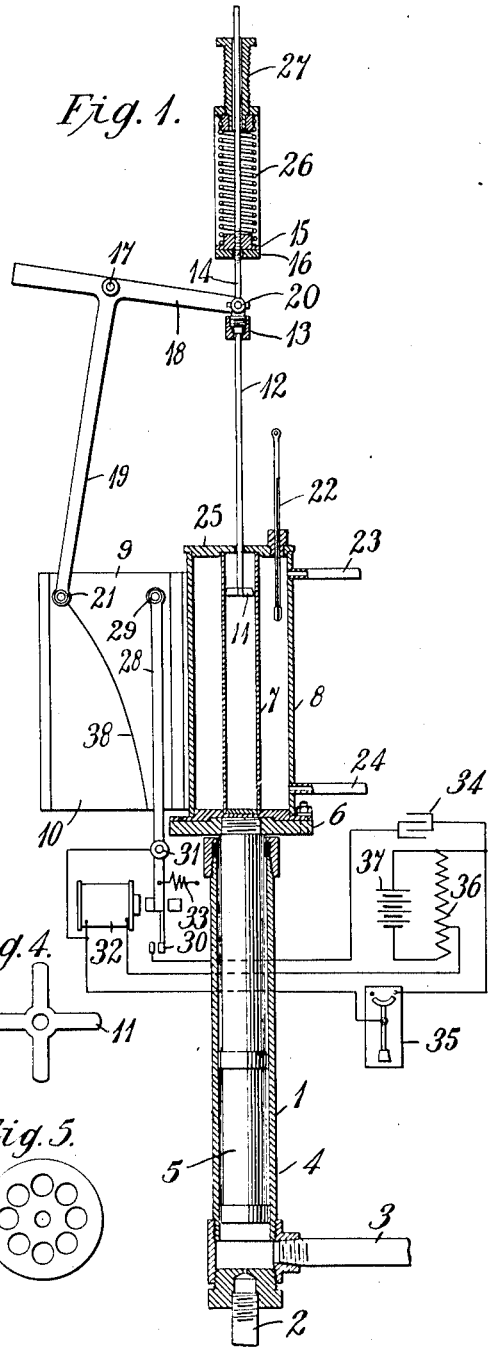
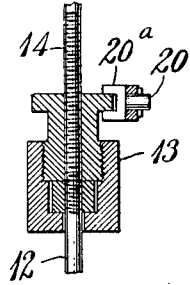
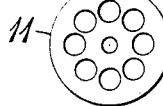
WITNESSES:
Fred H. Miller
J. H. Procter
INVENTOR
Henry R. Edgecomb
BY
Wesley G. Carr
ATTORNEY

UNITED STATES PATENT OFFICE.

HENRY R. EDGECOMB, OF WILKINSBURG, PENNSYLVANIA, ASSIGNOR TO WESTINGHOUSE ELECTRIC AND MANUFACTURING COMPANY, A CORPORATION OF PENNSYLVANIA.

MEASURING INSTRUMENT.

1,270,800. Specification of Letters Patent. Patented July 2, 1918.

Application filed August 11, 1913. Serial No. 784,043.

*To all whom it may concern:*

Be it known that I, HENRY R. EDGECOMB, a citizen of the United States, and a resident of Wilkinsburg, in the county of Allegheny and State of Pennsylvania, have invented a new and useful Improvement in Measuring Instruments, of which the following is a specification.

My invention relates to measuring instruments and particularly to viscosimeters.

The object of my invention is to provide a viscosimeter which will indicate the relative viscosity of any oil or grease at any temperature.

Viscosimeters have been provided for measuring the viscosity of light oils. Viscosimeters of this form usually comprise a tube having a constricted orifice, and the viscosity of such liquid as may be placed in the tube is determined by locating the tube in a heated chamber and noting the time required for the liquid to flow or drip from the orifice at a certain temperature. The same scheme could be used for heavy oils and grease were it not for the fact that, when melted, the heavy greases undergo a physical change which renders them unfit to be used as lubricants when they again solidify. Furthermore, some greases do not again solidify after being heated but leave a residue when cooled. In my invention I provide means for recording the degree of viscosity of any grease or oil without necessarily subjecting the sample to heat; however, I provide a means for heating the sample if it is desired to determine the degree of viscosity at a relatively high temperature.

Figure 1 of the accompanying drawings is a front view of a viscosimeter shown partially in elevation, partially in section and partially in diagram. Fig. 2 is a side view of a portion of the viscosimeter shown in Fig. 1. Fig. 3 is a sectional view of an adjustable union and pivoting point which is embodied in my invention. Fig. 4 is a plan view of a form of piston used in my invention and Fig. 5 is a plan view of another form of piston used in my invention.

My invention, as shown in the accompanying drawing, comprises a hydraulic engine 1 having a needle valve inlet 2, an exhaust valve outlet 3, a cylinder 4 and a piston 5. On the upper end of the piston 5 is mounted a disk 6, which supports a second cylinder 7 and a jacketing cylinder 8. A rectangular plate 9, having its edges folded to hold a record sheet 10, is attached to the jacketing cylinder 8. A piston 11 of any desired form, as shown in Figs. 4 and 5, is mounted on a piston rod 12 and suspended within the cylinder 7 from a union 13 which is supported by a rod 14 fixed to a block 15 resting on a structure 16. A bell crank lever having arms 18 and 19 is pivoted at a stationary point 17. The arm 18 is pivotally operated by a pin 20 upon a block 20ª which is movably attached to the union 13. To the lower end of the arm 19 is attached a marking pen 21. The jacketing cylinder 8 is provided with openings for inserting a thermometer 22 and for pipes 23 and 24 which are used to circulate a heating or cooling fluid through the cylinder. The hydraulic engine may be supplanted by any type of constant power engine, such as an electric motor or a steam engine. The jacketing cylinder 8 is fitted with a split removable top 25. A spring 26 is provided for opposing the motion of the rod 14 and may be regulated by an adjusting screw 27. The union 13 is provided to facilitate the changing of samples and pistons.

In order to time the operation of the cylinder 7, I provide a timing device comprising a lever 28 having a marking pen 29 at one end and carrying a contact member 30 at the other end and having a pivotal support at 31, an electro-magnet 32, a spring 33, a condenser 34, a time-actuated contact maker 35, a resistor 36 and a source of current 37, connected as shown in Fig. 1.

The samples of heavy grease to be tested must first be shredded by being placed in cylinders with wire mesh tops and then pressed through this wire mesh into the sample-containing cylinder 7. This shredded state is not detrimental to the sample, but facilitates the handling of the same. After the sample has been placed in the containing cylinder 7, the latter is inserted into the jacketing cylinder and the piston 11 is placed on top of the grease in the containing cylinder. If measurement of the viscosity is desired at any predetermined temperature, the jacketing cylinder 8 is filled with a liquid which will maintain the sample under test at the desired temperature, as indicated by the thermometer 22.

A slip of paper 10 being inserted in the holder 9, the hydraulic engine 1 is operated by admitting water through the needle valve inlet 2 to cause the piston 5, the cylinder 7 containing the sample to be tested, the jacketing cylinder 8 and the rectangular plate 9 containing the record sheet 10 to rise at a uniform rate. The viscosity of the grease under test tends to prevent it from flowing. Hence, as the cylinder 7 rises, the piston 11 tends to rise also but it is opposed by the spring 26, which has been previously adjusted in accordance with the particular grease to be measured. However, the piston 11 will rise an amount which is proportional to the pressure required to overcome the action of the spring, and the pen 21 will trace upon the record sheet a curve which is a measure of the viscosity of the grease for a given time.

The timing device is controlled by the clockwork contacting device 35 which allows the current to flow through the electromagnet 32 in order that it may attract the lever 28 and, at the same time, insures charging the condensers 24 which continue to excite the electromagnet after the contact is broken an appreciable time. The spring 33 draws the lever 28 back after the condenser has discharged, thus tracing an irregular line (not shown) as the record sheet moves upwardly, which is an accurate measurement of the time of operation, as each notch on the irregular line represents a definite time interval. It is essential to know the time of operation since the viscosity of a fluid is the resistance offered by the fluid to the relative motion of its particles in a unit of time at any temperature.

Variations in form, operating means, dimensions and relative arrangements of parts which do not materially affect the mode of operation or result are intended to be included within the scope of my invention.

I claim as my invention:

1. A measuring instrument comprising a container for holding a sample of material to be tested, means for moving said container, a movable pressure member located within said container but yieldingly supported exteriorly thereof, and means for recording the movement of said pressure member.

2. A viscosimeter comprising a container for holding a sample to be tested, means for moving the said container, a member supported exteriorly of the said container and adapted to be actuated in proportion to the viscosity of the sample within said container, and means for recording the pressure of the said sample upon said member when said container is moved.

3. A measuring instrument comprising a container for holding a sample to be tested, means for moving said container, a movable piston within said container, and means for recording the movement of said piston when said container is moved.

4. A measuring instrument comprising a container for holding a sample to be tested, means for moving said container, a movable piston within said container, means for recording the movement of said piston when said container is moved, and means for recording the time during which said container moves.

5. A measuring instrument comprising a cylinder, means for axially moving said cylinder at a uniform rate, a movable piston within said cylinder, and means for recording the time of the said axial movement of said cylinder.

6. A measuring instrument comprising a container for holding a sample to be tested, means for moving said container at a uniform rate, a pressure member located within said container but supported and movable independently thereof, and means for recording the movement of said pressure member.

7. A viscosimeter comprising a container for holding a sample to be tested, means for moving the said container at a uniform rate, a movable member supported exteriorly of the said container and adapted to engage the sample within said container, and means for recording the pressure of the said sample upon said member when said container is moved.

8. A measuring instrument comprising a container for holding a sample to be tested, means for moving said container at a uniform rate, a movable piston within said container, and means for recording the movement of said piston when said container is moved.

9. A measuring instrument comprising a container for holding a sample to be tested, means for moving said container at a uniform rate, a movable piston within said container, means for recording the movement of said piston when said container is moved, and means for recording the time during which said container moves.

10. A measuring instrument comprising a movable container for holding a sample to be tested, a resiliently supported member within said container, and means for recording the movement of said member when said container is moved.

11. A measuring instrument comprising a cylinder, means for axially moving said cylinder, a piston within said cylinder, means for opposing the motion of said piston, means for recording the movement of said piston, and means for recording the time during which said cylinder moves.

12. A measuring instrument comprising a cylinder, means for axially moving said cylinder, means for jacketing said cylinder, a piston slidably mounted within said cylinder, resilient means for opposing the motion of said piston, means for recording the movement of said piston, and means for recording the time during which said cylinder moves.

13. A measuring instrument comprising a cylinder for containing a sample to be measured, means for axially moving said cylinder, means for maintaining said cylinder at any predetermined temperature, a piston slidably mounted in said sample-containing cylinder, resilient means for opposing the motion of said piston, means for adjusting the said resilient opposing means, means for recording the movement of said piston, and means for recording the time during which said sample-containing cylinder moves.

14. A measuring instrument comprising a cylinder for containing a sample of grease to be tested, means for axially moving said cylinder, a jacketing cylinder surrounding said sample-containing cylinder, a piston slidably mounted in said sample-containing cylinder, resilient means for opposing the motion of said piston, means for adjusting the said resilient opposing means, means for recording the movement of said piston, means for connecting said piston to said recording means, and means for recording the time during which said sample-containing cylinder moves.

15. A measuring instrument comprising a cylinder for containing a sample of grease to be tested, means for axially moving said cylinder, means for maintaining said sample at any predetermined temperature, a piston slidably mounted in said sample-containing cylinder, resilient means for opposing the motion of said piston, means for adjusting the said resilient opposing means, a movable record sheet, means for recording the movement of said piston on said record sheet, and means for recording on said record sheet the time during which said sample-containing cylinder moves.

16. A viscosity measuring instrument comprising a cylinder for containing a sample to be tested, means for axially moving said cylinder, a jacketing cylinder for surrounding said containing cylinder, means within said jacketing cylinder for maintaining said sample at a predetermined temperature, a piston slidably mounted in said containing cylinder, an adjustable spring for opposing the motion of said piston, means for operatively connecting said piston and said spring, means for disconnecting said piston, a movable record sheet, means for recording the movement of said piston on said record sheet, and means for recording on said record sheet the time during which said containing cylinder moves.

17. A viscosimeter for heavy oils and grease comprising a containing cylinder, hydraulic means for operating said cylinder, means for maintaining said cylinder at a predetermined temperature, a piston slidably mounted in said cylinder, an adjustable spring for opposing the motion of said piston, means for operatively connecting said spring and said piston, a record sheet attached to said cylinder, means for recording the movement of said piston on said record sheet, and means for recording on said record sheet the time of operation of said cylinder.

In testimony whereof, I have hereunto subscribed my name this 31st day of July, 1913.

HENRY R. EDGECOMB.

Witnesses:
R. N. E. MOORE,
B. B. HINES.